UNITED STATES PATENT OFFICE.

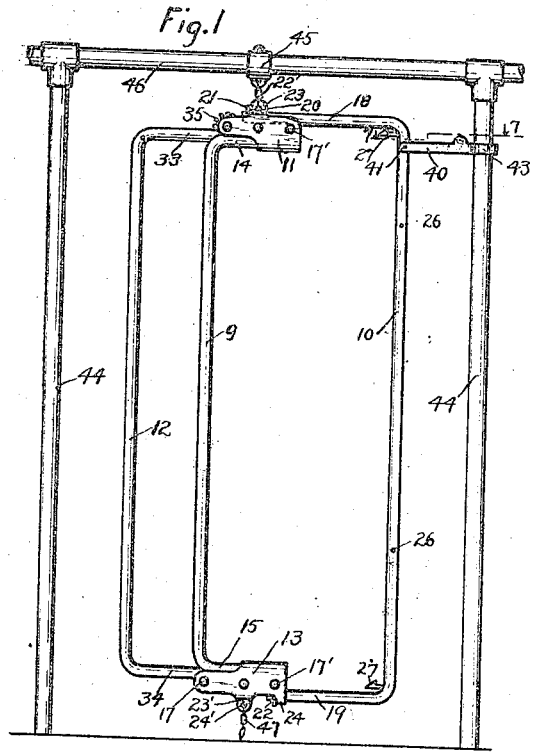

LOUIS O. FRENCH, OF MILWAUKEE, WISCONSIN.

COMBINED STANCHION AND GUARD.

1,239,782.  Specification of Letters Patent.  Patented Sept. 11, 1917.

Application filed July 21, 1916.  Serial No. 110,436.

*To all whom it may concern:*

Be it known that I, LOUIS O. FRENCH, a citizen of the United States of America, residing at Milwaukee, in the county of Milwaukee and State of Wisconsin, have invented certain new and useful Improvements in Combined Stanchions and Guards, of which the following is a specification, reference being had to the accompanying drawings, forming a part thereof.

This invention relates to a combined stanchion and guard. The invention is more particularly designed to provide a stanchion with a movable guard.

Heretofore it has been the practice to mount fixed guards on the stall or stanchion to prevent the animal entering its head between the stall uprights and the stanchion when driven into the stall but these constructions have the disadvantage of impeding the animal's free movement while retained in the stall. It has also been customary to provide movable guards mounted on the stall frame but these add extra equipment to the stall and have to be separately operated from the operation of the stanchion itself. It is the essential object of this invention to provide the stanchion with a movable guard which will not in any way interfere with the operation of the stanchion and which will coöperate with the movable side bar thereof to guard the spaces between the stanchion and the stall uprights when the animals are driven into the stall and which is moved into the fixed side bar when the stanchion is closed to permit free movement of the animal in the stall.

The invention is further designed to provide an adjustable stanchion with a movable guard which may be moved outwardly proportionate with the adjustment of the fixed stanchion bar so that said guard bar will be moved to substantially the same distance from the adjacent stall upright for different adjustments of the fixed bar.

A further object of the invention is to provide a combined stanchion and guard consisting of few parts, mainly of metal tubing, the guard bar folding up within the fixed side, the whole being designed to produce a sanitary construction.

The invention is further designed to provide a new and improved form of stanchion. The invention further consists in the several features hereinafter set forth and is more particularly defined by claims at the conclusion hereof.

In the drawings:

Figure 1 is a view of the device embodying the invention showing it being in the stall, the guard and movable side bar being shown in guarding position;

Fig. 2 is a view of the stanchion in closed position;

Fig. 3 is a vertical sectional view of the stanchion, parts being broken away;

Fig. 4 is a section taken on the line 4—4 of Fig. 3;

Fig. 5 is a top view of the stanchion;

Fig. 6 is a section taken on the line 6—6 of Fig. 3;

Fig. 7 is an enlarged section taken on the line 7—7 of Fig. 1;

Fig. 8 is a section taken on the line 8—8 of Fig. 3.

In general the stanchion comprises a relatively fixed adjustable side bar 9, a movable side bar 10, a top bar 11, a movable guard bar 12, a bottom bar 13, means for locking the stanchion closed, and means for operating the movable guard.

The side bar 9, preferably of curved channel shape in cross-section, has its ends 14 and 15 bent inwardly to form a U-shaped member. These ends are adjustably secured to the top bar 11 and bottom bar 13 in the following manner. Both of the top and bottom bars are channel-shaped in cross-section and each are provided with inwardly projecting lugs 16 for engaging the edges of the ends of the fixed bar, said top and bottom bars being adjustably clamped to said fixed bar by bolts 17 and 17′, the lugs 16 coöperating to secure said bar in place. By adjusting the position of the fixed bar relative to the bars 11 and 13 the stanchion may be made to accommodate cattle of different sizes.

The movable side bar 10 is a U-shaped channel bar, the ends 18 and 19 of which are slidably mounted on rollers 20 carried by the bolts 17 within the top and bottom bars. This bar is provided with stop pins 21 and 22 adapted to engage lugs 23 and 24 on the top and bottom bars respectively to limit the outward movement of said side bar. The lugs 23 on the top bar are provided with apertures 20′ for receiving the stanchion fastening means such as the chain 22' and the bottom bar is provided with apertures 24' for receiving fastening means such as the chain 47.

The means for securing the movable side bar closed consists of a latch rod 25 slidably mounted within the hollow of the channel bar 10 and guided between the inner side thereof and guide pins 26 secured to the bar, and hooked latches 27 secured to said rod 25 and adapted to engage bolts 17' secured to the top and bottom bars. A spring 29 is secured at one end to the bar 10 and at its other to the rod 25 to maintain said latches in locking engagement with said bolts 17'. The movable side bar is unlocked by operator's pressing down on the thumb piece 30 of the rod 25 which is preferably located at about the center of the length of the bar, the downward movement of the rod 25 disengaging said latches which are free to move in slots 31 and 32 in said bar 10. To close the stanchion the side bar is moved inwardly and the latches are provided with inclined front ends which engage the bolts to move the rod 25 downwardly against the action of the spring until the bar 10 reaches its position adjacent the top and bottom bars at which time the latches move upwardly into locking engagement with said bolts thus automatically locking the stanchion closed. The parts of the lock being housed within the channel renders the locks practically cow-proof.

The movable guard bar 12 consists of a U-shaped channel bar which is adapted to telescope within the fixed channel bar 9 when in closed position so as not to interfere with the free movement of the animal. The ends 33 and 34 of said bar are also slidably mounted within the top and bottom bar and are adapted to ride on the rollers so mounted therein.

The means for operating the guard bar comprises means preferably operated and controlled by the movement of the movable side bar. This means consists of a pinion 35 pivotally mounted on one of the bolts 17 and a pair of racks 36 and 37 secured to the movable side and guard bars respectively. The hub portion 38 of said pinion extends outwardly to form a roller for said movable bars. The end 18 of the top bar is provided with a longitudinal slot 39 in which the pinion runs and the rack 36 is mounted within said side bar adjacent said slot, said pinion and slot coöperating to form a guide for the movable side bar. The end 33 of the guard bar has the rack 37 mounted in the channel thereof, the pinion running in said channel to guide said guard bar. The racks 36 and 37 are mounted on opposite sides of the pinion 35 so that a movement of the movable side bar in one direction will produce a movement of the guard bar in the opposite direction. The pinion 35 being carried by the top bar 11 when the side bar 9 is moved outwardly or inwardly with respect to said bar 11 there will be less or greater travel of the pinion on the racks 36 and 37 depending upon the adjustment of the fixed bar and in this way the guard bar 12 will always be moved a certain distance from the stall post.

The movable side bar 10 is provided with means for securing it to the stall upright when in open position. This means consists of a pair of arms 40 pivotally secured to said bar by a bolt 41 and normally pressed inwardly by a spring 42 which is adapted to hold the ends 43 of said arms in engagement with the stall upright 44. The chain 22' is secured to a collar 45 mounted on the horizontal stall frame member 46 and the lower chain 47 may be secured to the floor in any suitable manner.

With the construction above described, when it is desired to open the stanchion, the movable side bar 10 is unlocked, as previously described, and moved outwardly into open position. Simultaneously with this movement of the side bar 10, the guard bar 12 will be moved outwardly in guarding position through the gearing connection previously described with the result that both bars will block the space on each side of the stanchion and thus prevent the animal from entering its head between the sides of the stanchion and the adjacent stall standards 44, the arms 40 serving to secure the stanchion against lateral movement. On the closing of the stanchion by the inward movement of the movable side bar, the guard bar also moves inwardly and telescopes within the fixed bar when the side bar is locked to the top and bottom bars, the guard bar being locked through the gearing connection. As previously pointed out the fixed side bar 9 is adjustable with respect to the top and bottom bars 11 and 13 with the result that there is a varying travel of the guard bar with respect to the side bar 9 for different positions of adjustment but due to the arrangement of the parts the guard bar always assumes the same position with respect to the adjacent stall upright when it is moved to guarding position.

With the present construction also the stanchion may be opened and closed with one hand from one side thereof and practically no more work is necessary to operate the guard than to close the stanchion as both are closed by the movement of the side bar. Furthermore when the stanchion is open the guard bar is always in position so that the attendant cannot forget to operate the guard.

I have shown a construction in which the movable guard is operated and controlled by the movement of the movable side. I am aware that the guard bar may be arranged to be separately operated, though less advantageously, by hand and that the other variations are possible in the details of this construction without departing from the spirit of my invention and consequently I do not intend to limit myself to the specific form herein shown and described.

What I claim as my invention is:

1. In a stanchion, the combination of a fixed stanchion member, a movable side bar, a movable guard bar, and a gearing connection between said movable bars whereby said guard bar is moved into and out of guarding position on the outward and inward movement of said side bar.

2. In a stanchion, the combination of a fixed stanchion member, a movable side bar, a movable guard, means for locking the side bar closed, and a gearing connection between said movable guard and side bar whereby said guard is moved into and out of guarding position on the outward and inward movement of said side bar and is locked in closed position on the locking of the side bar.

3. The combination, with a stanchion including a fixed bar and a movable side bar, of a guard mounted on the stanchion adjacent said fixed bar, and a gearing connection between said movable side bar and guard for conjointly moving said guard and side bar into and out of guarding position on the movement of one of them.

4. The combination, with a stall frame including uprights, of a stanchion including a movable side bar and a fixed side bar, a U-shaped slidably movable guard bar mounted on the stanchion adjacent said fixed bar, and means for operating said guard bar simultaneously with the movement of said side bar, said movable bars adapted to be moved into guarding position between the stanchion and the stall uprights when the stanchion is open and out of guarding position on the closing of the stanchion to permit free movement of the animal therein.

5. In a stanchion, the combination, with the relatively fixed parts thereof including a fixed side bar, a top bar having a hollow therein, and a movable side bar, of a guard mounted on the stanchion adjacent the fixed side bar, and means within the hollow of the top bar and operatively connected with said guard and movable side bar for simultaneous movement of said guard and side bar into and out of guarding position on the movement of one of them.

6. The combination, with a stanchion including top and bottom bars, a fixed side bar, and a movable side bar, of a guard bar slidably mounted within said top and bottom bars, and means for sliding said guard bar simultaneously with the movement of the movable side bar.

7. The combination, with a stanchion including a U-shaped channel fixed bar and a U-shaped slidably movable side bar, of a U-shaped movable guard bar slidably mounted within the fixed bar, means for simultaneously operating said movable side and guard bars, and means for locking said bars to close the stanchion.

8. The combination, with a stanchion including a top bar, a bottom bar, a fixed side bar adjustably secured to said top and bottom bars, and a movable side bar, of a guard mounted adjacent said fixed bar, and means for moving said guard outwardly and inwardly proportionate to the adjustment of the fixed bar.

9. The combination, with a suspended stanchion comprising a top bar, a bottom bar, a channel fixed bar secured to said top and bottom bars, a U-shaped movable side bar slidably mounted within said top and bottom bars, and means for securing said movable side bar closed, of a U-shaped movable guard bar slidably mounted within the top and bottom bars, and means for simultaneously operating said movable guard on the operation of the said bar and for locking it closed.

10. The combination, with a suspended stanchion comprising a top bar, a bottom bar, a U-shaped channel fixed bar secured to said top and bottom bars, a U-shaped channel movable side bar slidably mounted within said top and bottom bars, means for locking said movable side bar closed, and controlling means for said locking means disposed within the channel of said movable side bar, of a U-shaped movable guard bar slidably mounted within the fixed bar, and means for operating said movable guard bar.

LOUIS O. FRENCH.

Copies of this patent may be obtained for five cents each, by addressing the "Commissioner of Patents, Washington, D. C."